(12) United States Patent
Chamberlain et al.

(10) Patent No.: US 7,933,862 B2
(45) Date of Patent: Apr. 26, 2011

(54) ONE CLICK CONDITIONAL FORMATTING METHOD AND SYSTEM FOR SOFTWARE PROGRAMS

(75) Inventors: Benjamin C. Chamberlain, Redmond, WA (US); Brandon G. Weber, Kirkland, WA (US); Bruce Cordell Jones, Bellevue, WA (US); Charles D. Ellis, Seattle, WA (US); Christopher M. Street, Redmond, WA (US); David E. Gainer, Redmond, WA (US); Eric B. Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 10/951,468

(22) Filed: Sep. 27, 2004

(65) Prior Publication Data

US 2006/0074866 A1  Apr. 6, 2006

(51) Int. Cl.
*G06F 7/00* (2006.01)
*G06F 17/00* (2006.01)

(52) U.S. Cl. ......... 707/602; 707/756; 715/234; 715/235
(58) Field of Classification Search .................. 707/100, 707/102, 104.1; 715/212, 217, 219
See application file for complete search history.

(56) References Cited

U.S. PATENT DOCUMENTS

| | | | | |
|---|---|---|---|---|
| 5,255,363 A | | 10/1993 | Seyler | 715/526 |
| 5,283,856 A | | 2/1994 | Gross et al. | 706/47 |
| 5,566,291 A | * | 10/1996 | Boulton et al. | 715/709 |
| 5,632,009 A | * | 5/1997 | Rao et al. | 715/509 |
| 5,903,905 A | * | 5/1999 | Andersen et al. | 715/526 |
| 6,349,315 B1 | * | 2/2002 | Sonoyama et al. | 715/528 |
| 6,490,600 B1 | | 12/2002 | McGarry | 715/503 |
| 6,640,234 B1 | | 10/2003 | Coffen et al. | 715/538 |
| 2002/0198906 A1 | | 12/2002 | Press | 715/503 |
| 2004/0088650 A1 | * | 5/2004 | Killen et al. | 715/503 |
| 2004/0135805 A1 | * | 7/2004 | Gottsacker et al. | 345/751 |
| 2006/0005112 A1 | * | 1/2006 | Lilly et al. | 715/500 |

OTHER PUBLICATIONS

European Search Report for Application No. 05105354.4, dated Oct. 6, 2008, 3 pp.
Friedman, Mark et al., "Creating an Excel-Based Executive Support System," Journal of Corporate Accounting & Finance, vol. 15, No. 5, Jun. 18, 2004, XP002481898, pp. 53-59. url: http://www3.interscience.wiley.com/journal/109083852/abstract>[retrieved on May 28, 2008].

(Continued)

*Primary Examiner* — Mohammad Ali
*Assistant Examiner* — Angelica Ruiz
(74) *Attorney, Agent, or Firm* — Merchant & Gould P.C.

(57) ABSTRACT

A method of conditionally formatting a display of data is disclosed that involves providing a preliminary display automatically showing the intended consequences of the condition applied to the data prior to making the condition actually apply to the data. This is especially useful in analysis of spreadsheet data by conditionally formatting certain data. The method involves identifying one or more parameters of the data to be conditionally formatted on the display, selecting a predetermined condition; and automatically applying temporarily the predetermined condition to the parameter(s), displaying a temporary preview on the display of the predetermined condition applied to data that meet the predetermined condition. The method also provides the capability to preliminarily change the conditions and parameters applied to the data and automatically provide appropriate previews of the effect of such application of changed conditions on the displayed data.

12 Claims, 15 Drawing Sheets
(13 of 15 Drawing Sheet(s) Filed in Color)

OTHER PUBLICATIONS

Stein, J.D., "Spreadsheet Smarts," AICPA Journal of Accountancy, vol. 189, No. 1, Jan. 2000, XP002481899, pp. 1-4. url: http://www.aicpa.org/pubs/jofa/jan2000/stein.htm>[retrieved on May 28, 2008].
Anonymous, "Conditional Formatting" Online Publication, Aug. 3, 2004, XP002481900 Web Archive, pp. 1-4. url: http://web.archive.org/web/20040803153634/http://www.cpearson.com/excel/cformatting.htm>retrieved on May 28, 2008.
Anonymous, "Introduction to Microsoft Word97 for Windows 95/98—A Guide to Basic Features," Online Publication, Sep. 1997, XP002481901, 70 pp. url: http://www.unt.edu/training/Word97/Word97Intro.PDF> [retrieved on May 27, 2008 ]p. 36, line 1-line 4.

* cited by examiner

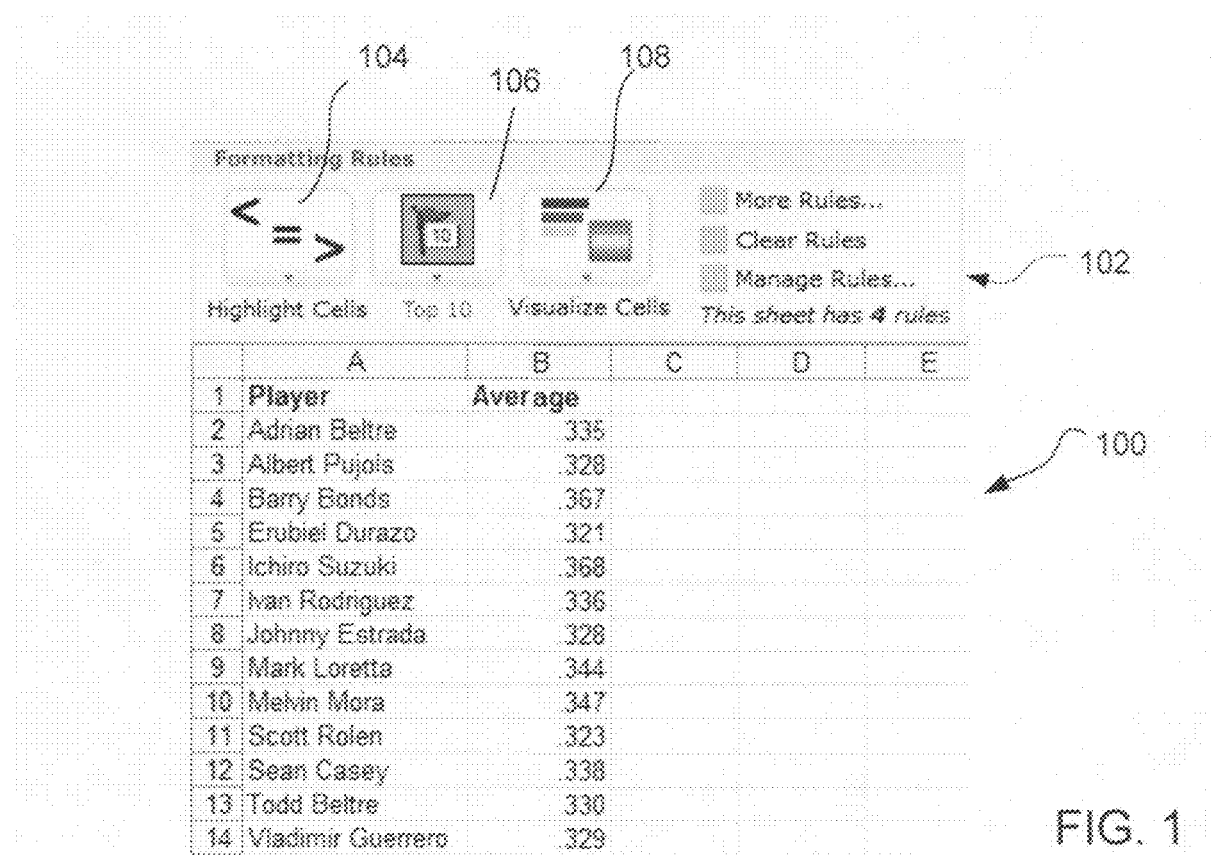
FIG. 1
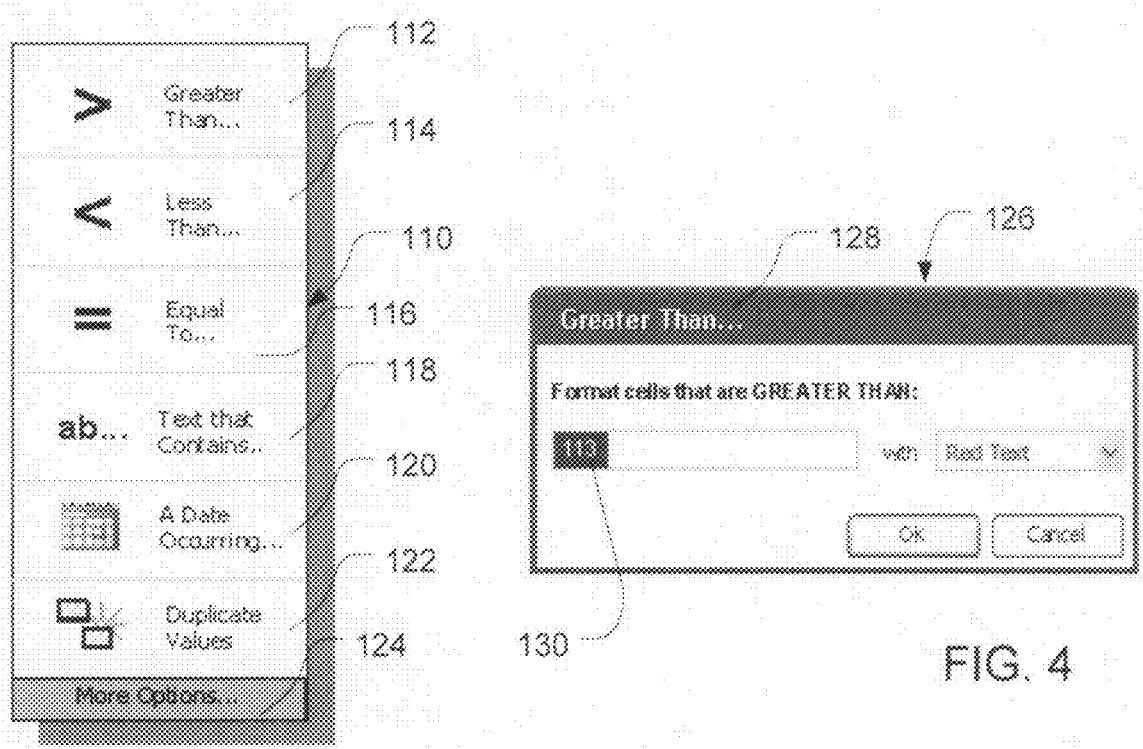
FIG. 3
FIG. 4

| | A | B | C | D |
|---|---|---|---|---|
| 1 | | | | |
| 2 | | Tools | Supplies | Furniture |
| 3 | Jan | $ ↑19,359.00 | $ 10,837.00 | $ 9,594.00 |
| 4 | Feb | $ ↓10,879.00 | $ 14,787.00 | $ 3,992.00 |
| 5 | Mar | $ ↓10,654.00 | $ 18,689.00 | $ 12,583.00 |
| 6 | Apr | $ ↑26,247.00 | $ 22,785.00 | $ 15,770.00 |
| 7 | May | $ →14,654.00 | $ 23,359.00 | $ 9,038.00 |
| 8 | Jun | $ ↓ 7,769.00 | $ 27,110.00 | $ 14,223.00 |
| 9 | Jul | $ ↓ 8,237.00 | $ 18,832.00 | $ 3,138.00 |
| 10 | Aug | $ ↓12,091.00 | $ 33,191.00 | $ 4,073.00 |
| 11 | Sep | $ ↓ 5,358.00 | $ 27,610.00 | $ 10,549.00 |
| 12 | Oct | $ ↓ 5,689.00 | $ 31,763.00 | $ 13,992.00 |
| 13 | Nov | $ →18,208.00 | $ 14,408.00 | $ 4,401.00 |
| 14 | Dec | $ ↑30,805.00 | $ 10,031.00 | $ 3,901.00 |
| 15 | Total | $ 170,150.00 | $ 253,402.00 | $ 105,254.00 |
| 16 | Share | 22.35% | 33.28% | 13.82% |

# ONE CLICK CONDITIONAL FORMATTING METHOD AND SYSTEM FOR SOFTWARE PROGRAMS

TECHNICAL FIELD

The present invention relates to functions of computer applications. More particularly, the invention is directed to a user interface tool functionality that visually enhances formatted display selected by a user.

BACKGROUND OF THE INVENTION

Spreadsheet applications, such as Microsoft® Excel often present a tremendous amount of data to a user. In order to distill this large volume of information, a conditional formatting capability is provided in some conventional spreadsheet programs. Conditional formatting is one of the more accessible visualization concepts for users (spreadsheet users). It is easily accessible and users can use such conditional formatting to visually annotate their data for both analytical and presentation purposes.

However, current conditional formatting functionality is limited in use. It is not widely used by users because it is not easily accessed and can be difficult to use. Typically the user must author a complex conditional formula that returns true or false, a task that is beyond the average spreadsheet user. Some products offer a user interface for creating conditions without requiring a formula, but these are limited to just a few types of expressions, and do not come close to covering the full range of conditions that users want to apply to their data, such as comparison to the average, top/bottom ranking, time periods, etc. Further, conditional formatting in current products is usually limited to Boolean expressions and a single format (if the condition is true for a given data point, apply the format; if it is false, do not apply the format). Finally, the rules must be applied in order to see the results of application of the rule. This can be frustrating to a user if he or she doesn't already know the desired effect a specific conditional format will have on the data.

It is with respect to these and other considerations that the present invention has been made.

SUMMARY OF THE INVENTION

In accordance with the present invention, the above and other problems are solved by a conditional formatting tool that, with as simple as a single mouse click, automatically visually annotates data for both analytical and presentation purposes using expressions that are as simple or as complex as desired. Embodiments of the present invention introduce new types of conditional formats, where each data point is formatted differently according to its relative value. In one aspect, an embodiment of the invention includes a graphic display of conditions that can be selected by a user by a simple mouse click. When an item is selected, the program will present a simple dialog and temporarily apply the rule to an open spreadsheet. Thus there is an immediate representation on screen of the effect of the selection on the data. Any changes that the user makes in the dialog box will immediately be previewed in the spreadsheet, as an example, for text boxes, when focus is removed, and, for drop down menus, when a new choice is made. Once the temporary conditional formatting is modified or approved by the user, and there are no validation issues, the program creates a new formatting rule for the selection. This mechanism greatly enhances the efficiency of a spreadsheet or other application to a user.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 1 illustrates an exemplary Formatting Rules User Interface for a spreadsheet application according to an embodiment of the present invention.

FIG. 3 illustrates a drop down menu that appears when the Highlight Cells Picker object is selected on the user interface shown in FIG. 1.

FIG. 4 illustrates a dialog box that appears when one of the objects in the drop down menu shown in FIG. 3 is selected.

FIG. 24 is a screen shot of the spreadsheet shown in FIG. 23 when a user single clicks on the 3 Color Gradient object in the drop down menu shown in FIG. 22.

FIG. 25 is a screen shot of the spreadsheet shown in FIG. 22 when a user single clicks on the 2 Color Gradient object in the drop down menu shown in FIG. 22.

FIG. 27 is a screen shot of the spreadsheet shown in FIG. 26 when a user single clicks on the Icon Set of arrows in FIG. 26.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In this specification the terms "conditional formatting" and "formatting rule" are used interchangeably. The terms "rule" and "condition" are conceptually the same. In other words, a condition is a rule in the formatting context. Also, reference will be made to cell "content" or "value" in the examples that follow. The cell values are simply data parameters associated with the particular content being formatted. The data parameter may be other than a number, word, string of characters, etc. The data parameter may include any characteristic associated with the data to which the conditional formatting rule is to apply.

In general, the present invention relates to conditional formatting of a document. As an example, a spreadsheet in a spreadsheet program is used in this specification. Embodiments of the present invention, in particular, provide a user friendly mechanism to make conditional formatting easier to find, use and understand for users of the spreadsheet program. In accordance with embodiments of the invention, the methods described herein may be performed on a single, stand-alone computer system but are more typically performed on multiple computer systems interconnected to form a distributed computer network. FIG. 1 illustrates an exemplary screen display in accordance with an exemplary embodiment of the present invention of an exemplary spreadsheet 100 to which a Formatting Rules toolbar 102 attaches when a user clicks the Analysis tab on a spreadsheet display main toolbar. This Formatting Rules toolbar object 102 displays three conditional template objects: Highlight Cells Picker 104, Top Ten Picker 106, and Visualize Cells Picker 108, as well as links to a more advanced dialog offering additional condition types.

Figure 2:
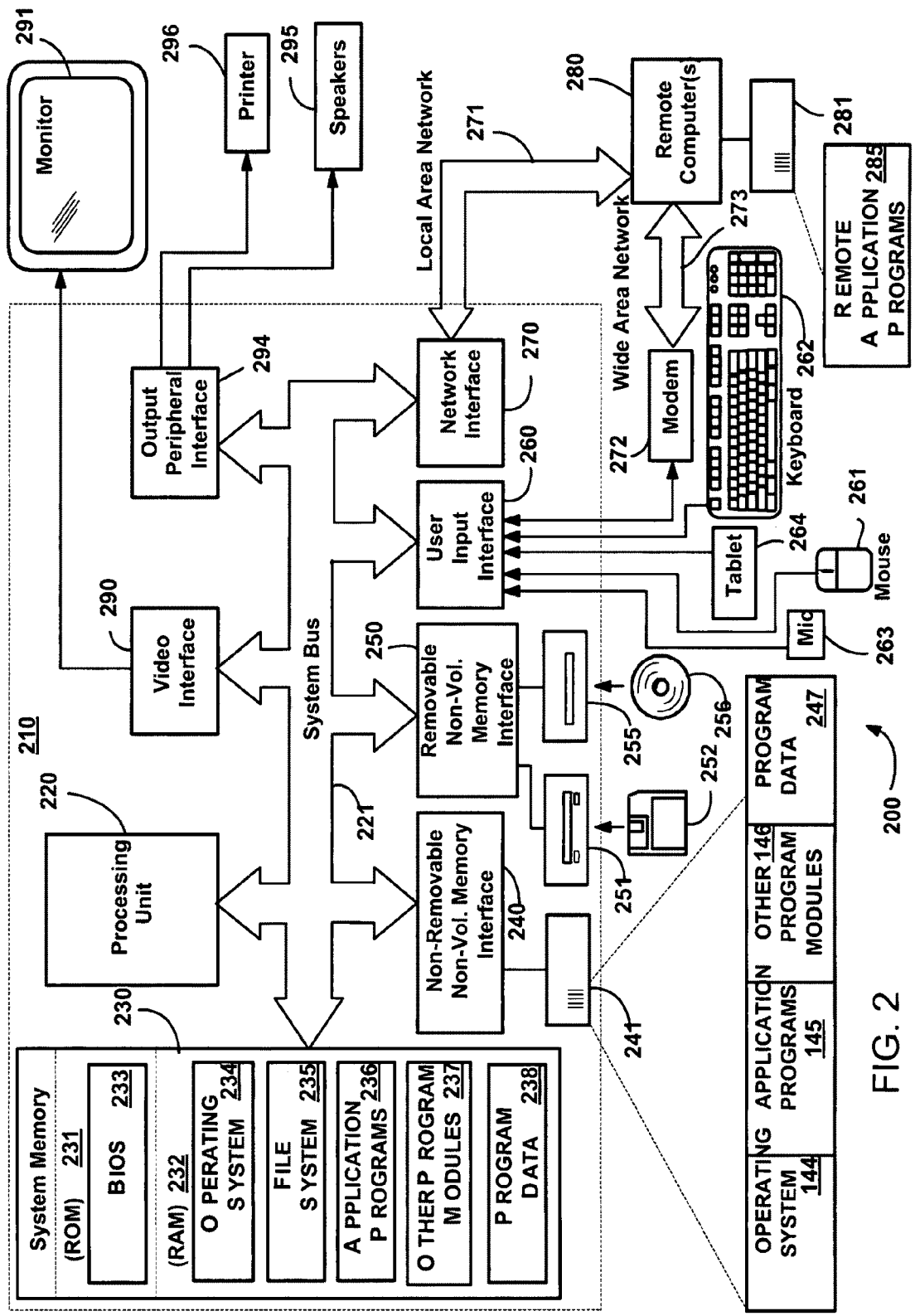
FIG. 2 shows a computer system environment that may incorporate software operating according to particular aspects of the present invention.

FIG. 2 illustrates an exemplary environment 200 for implementing an embodiment of the invention. This environment 200 includes a general purpose computing device in the form of a computer 210. Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 210 typically includes a variety of computer-readable media. Computer-readable media can be any available media that can be accessed by the computer 210 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 210. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, file system 235, application programs 236, other program modules 237 and program data 238.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media, discussed above and illustrated in FIG. 2, provide storage of computer-readable instructions, data structures, program modules and other data for the computer 210. In FIG. 2, for example, hard disk drive 241 is illustrated as storing operating system 144, application programs 145, other program modules 146 and program data 247. Note that these components can either be the same as or different from operating system 234, application programs 236, other program modules 237, and program data 238. Operating system 144, application programs 145, other program modules 146, and program data 247 are given different numbers herein to illustrate that, at a minimum, they are different copies. A user may enter commands and information into the computer 210 through input devices such as a tablet (electronic digitizer) 264, a microphone 263, a keyboard 262 and pointing device 261, commonly referred to as mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. The monitor 291 may also be integrated with a touch-screen panel (not shown) or the like that can input digitized input such as handwriting into the computer system 210 via an interface (not shown). Note that the monitor and/or touch screen panel can be physically coupled to a housing in which the computing device 210 is incorporated, such as in a tablet-type personal computer, wherein the touch screen panel essentially serves as the tablet 264. In addition, computers such as the computing device 210 may also include other peripheral output devices such as speakers 295 and printer 296, which may be connected through an output peripheral interface 294 or the like.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260 or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring back now to FIG. 1, the Highlight Cells Picker 104 contains options for creating a condition that can be evaluated on individual cells (or more generically speaking, on individual data points). Those cells containing values that make the condition true will be specially formatted. When a user clicks on the Highlight Cells Picker 104, a drop down menu 110 appears, which is separately shown in FIG. 3. This drop down menu 110 has five predetermined conditional options: Greater Than option 112, Less Than option 114, Equal To option 116, Text option 118, Date/Time option 120, and Duplicate option 122. Each of these predetermined conditional options has a one-click default template associated with it that will be further explained below. In addition, this menu 110 has a More Options link 124 that leads to more advanced set of formatting rules that are, or can be, defined by the user.

When any one of the options Greater Than, Less Than, or Equal To are single-clicked on, that option is highlighted. At the same time, a dialog box 126 appears, such as illustrated in FIG. 4. This dialog box 126 will have a title block 128 whose content matches the highlighted option, in this case, "Greater Than". A default parameter 130 that corresponds to the average of the selected range of cells in the spreadsheet appears highlighted along with a drop down menu for the user to select the format for those cells that meet the particular condition identified in the title block 128 also appears at the same time that the single-click is made. Further, the default condition indicated by the default parameter is preliminarily applied to the spreadsheet 100.

Figure 5:
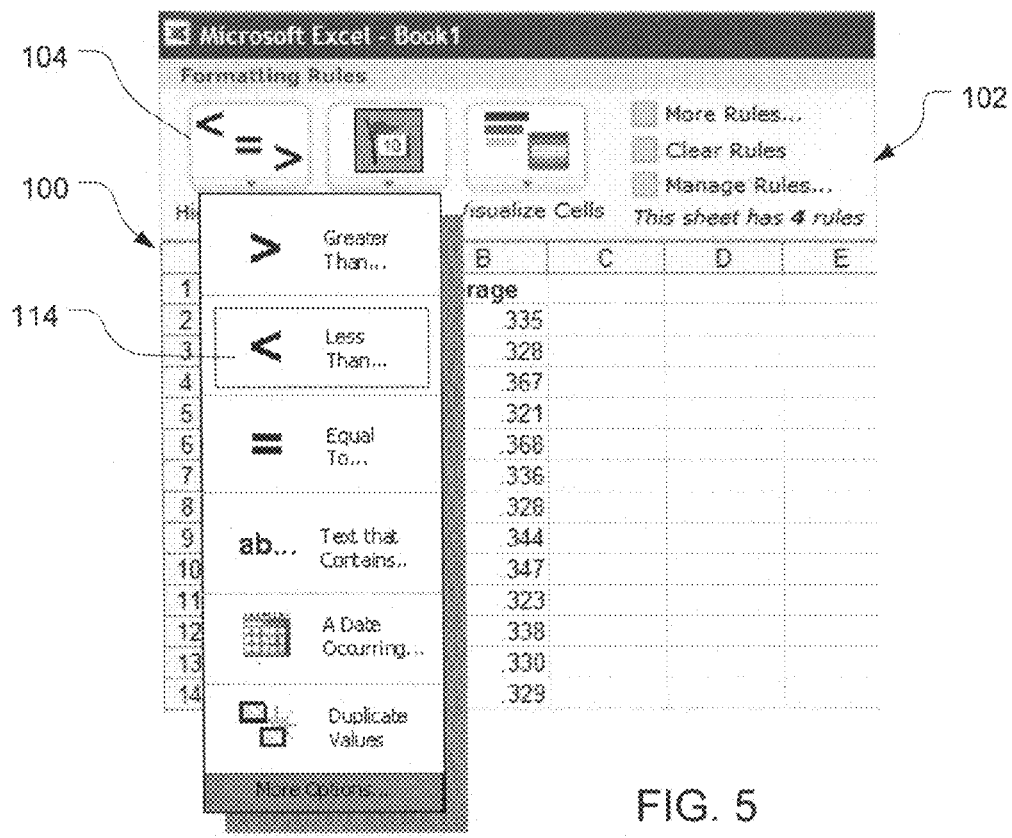
FIG. 5 is a screen shot of the spreadsheet shown in FIG. 1 when a user positions a cursor over the Less Than object in the drop down menu shown in FIG. 3 according a particular embodiment of the present invention.

This operational sequence for a spreadsheet is best illustrated with reference to the screens shown in FIGS. 5-8. In FIG. 5, a user has selected the Highlight Cells Picker object 104 in the Formatting Rules toolbar 102 for spreadsheet 100 and has placed his pointer over, and thus highlighted, the Less Than option 114 as indicated by the red outlining within the option rectangle. Next, the user single clicks on this option 114. The immediate result is as shown in FIG. 6.

Figure 6:
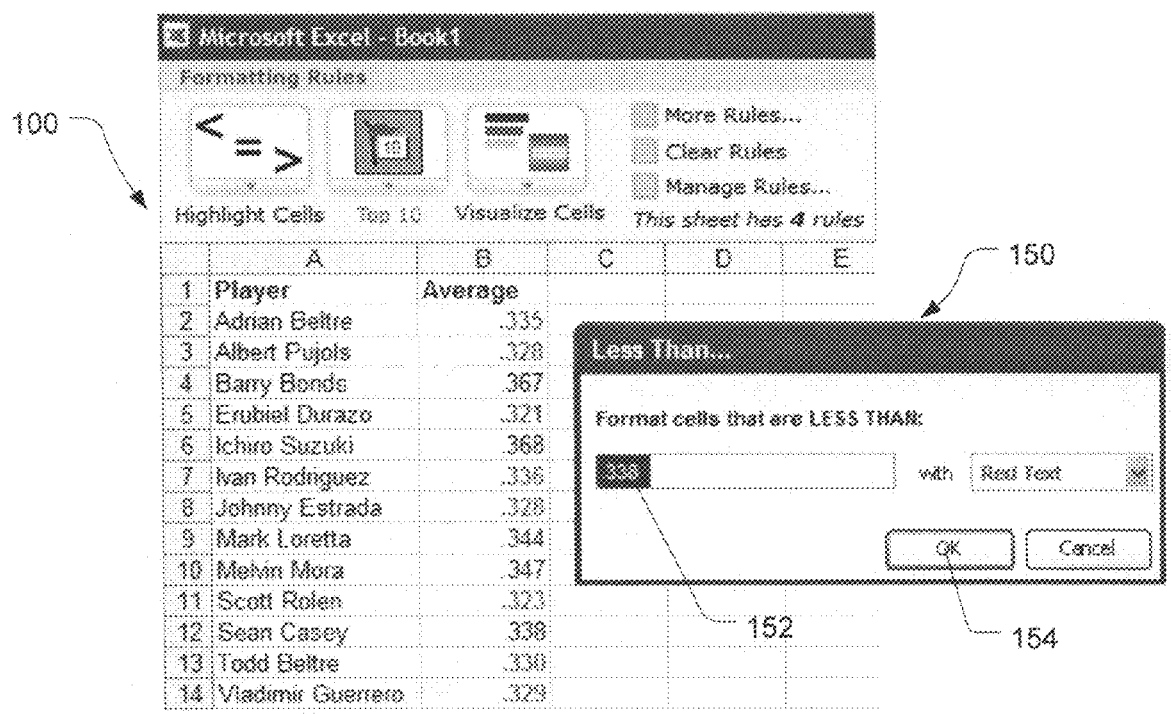
FIG. 6 is a screen shot of the spreadsheet shown in FIG. 1 when a user single clicks on the selected object highlighted in FIG. 5.

FIG. 6 illustrates the spreadsheet 100 modified with the default condition value shown in the dialog box 150 applied. The default value for each of the >, <, or = conditions is the average values in the range of cells under examination for formatting in the spreadsheet 100. In this example, the maximum value is 0.368. The minimum value is 0.321. The average of all of the batting averages is 0.338. This average 0.338 is shown in the value box 152 in the dialog box 150. The default formatting is red text, as indicated in the dialog box 150. Note that, in this fictional example, only Barry Bonds, Ichiro Suzuki, Mark Loretta, Melvin Mora, and Sean Casey have averages greater than 0.338, and thus remain black. All the rest are less than the average of 0.338, and thus meet the default less than condition, and therefore are shown in red. Focus is on the "OK" object 154 in the dialog box 150. If the user desires to utilize this conditional formatting with defaults, he or she simply clicks on "OK" object 154 and the dialog box 150 disappears, with the condition applied.

Figure 7:
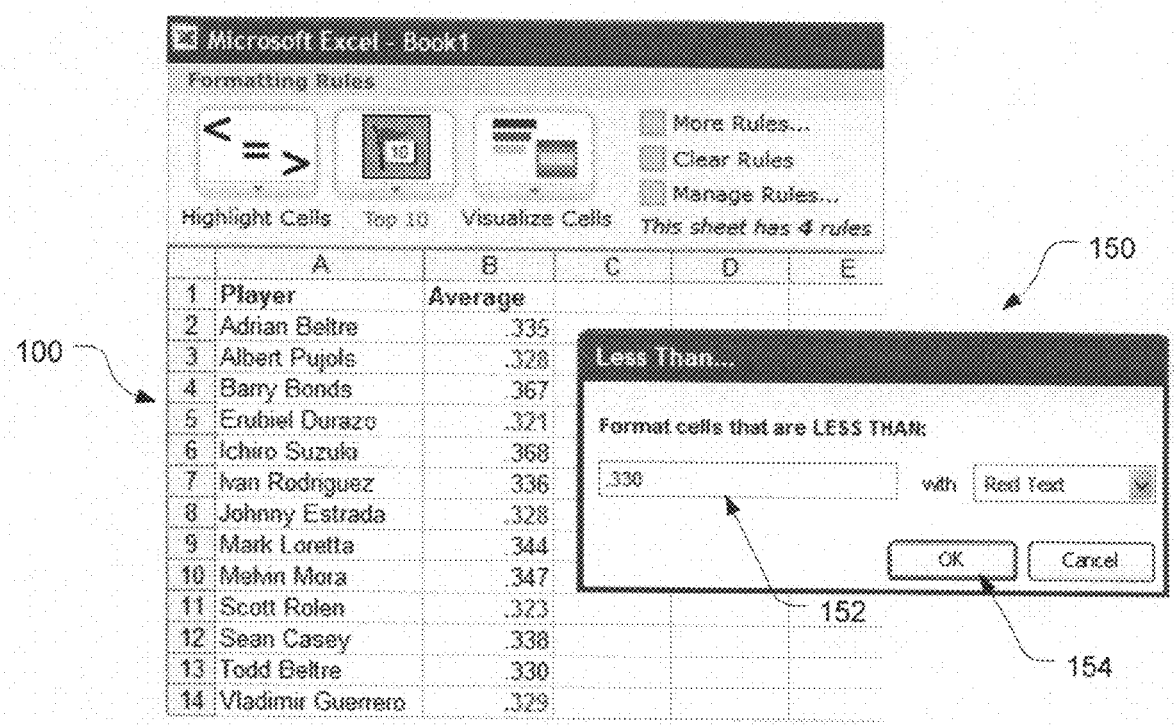
FIG. 7 is a screen shot of the spreadsheet shown in FIG. 6 in which a user has changed a default value in the dialog box.
Figure 8:
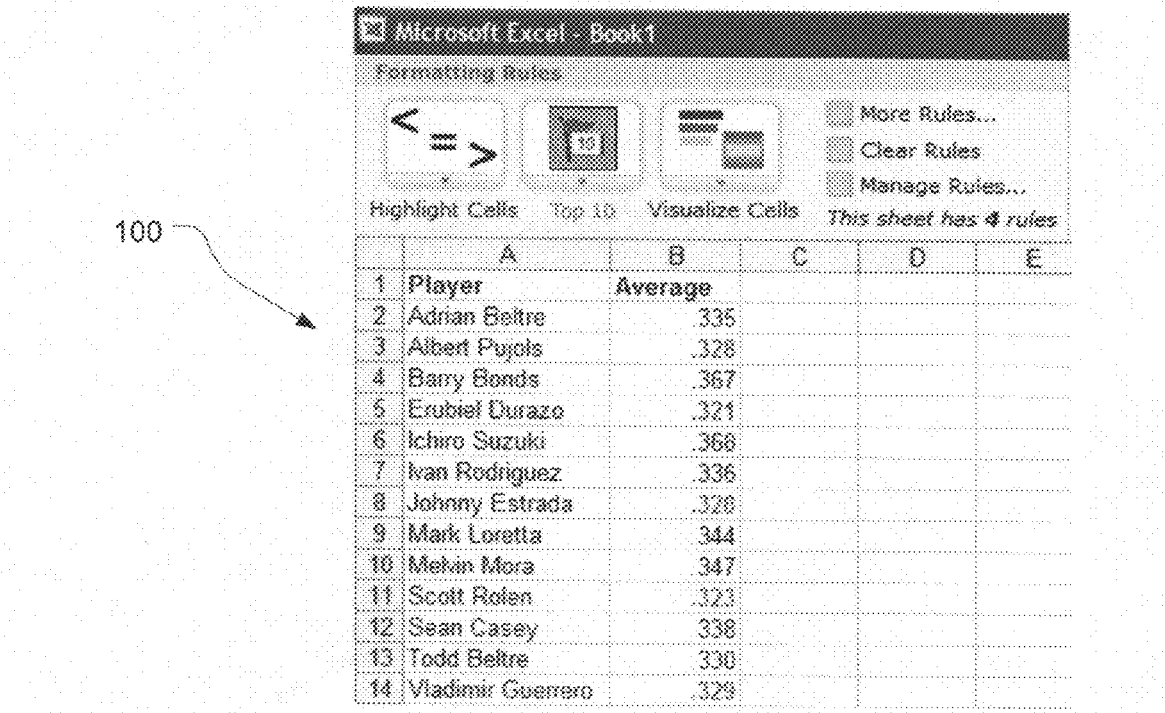
FIG. 8 is a screen shot of the spreadsheet shown in FIG. 7 after a user clicks "OK" in the dialog box to accept the preliminary changes as final changes in accordance with an embodiment of the present invention.

However, should the user desire a different rule, he simply has to change the default value 152 from 0.338 to another value. FIGS. 7 and 8 illustrate this condition. Again, the spreadsheet 100 is shown, but the user has lowered the value in the object 152 to 0.330. As this change is made, it is preliminarily immediately applied. Now only Albert Pugols, Erubiel Durazo, Johnny Estrada, Scott Rolen, and Vladimir Guerro are highlighted in red, as having averages less than 0.330. If the user is satisfied with this conditional rule applied, as visualized in the preliminary view, the user simply clicks on the focused "OK" object to make the conditional format permanent, as is shown in the resulting final spreadsheet 100 in FIG. 8.

Thus the default conditional formatting rules are initially applied in a preliminary view so the user can readily view the impact of the rule change being contemplated prior to its actual implementation to the document, in this case, the spreadsheet 100. A similar functionality applies to each of the three objects in the Highlight Cells Picker object 104. The Greater Than object 112 and Equal To object 116 each operate in the same manner as the Less Than object 114 explained above, except that the conditional criteria differ.

Figure 9:
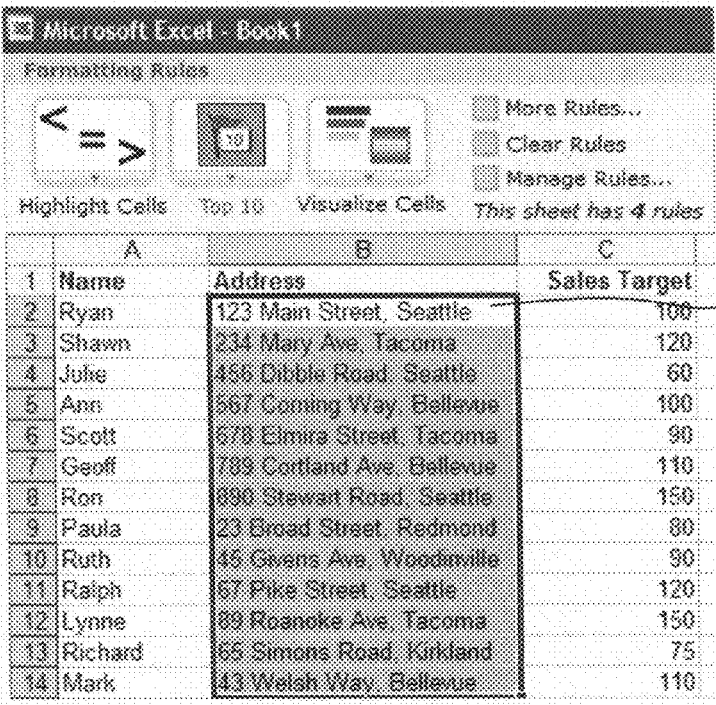
FIG. 9 is a screen shot of a spreadsheet that contains textual data in its cells.
Figure 11:
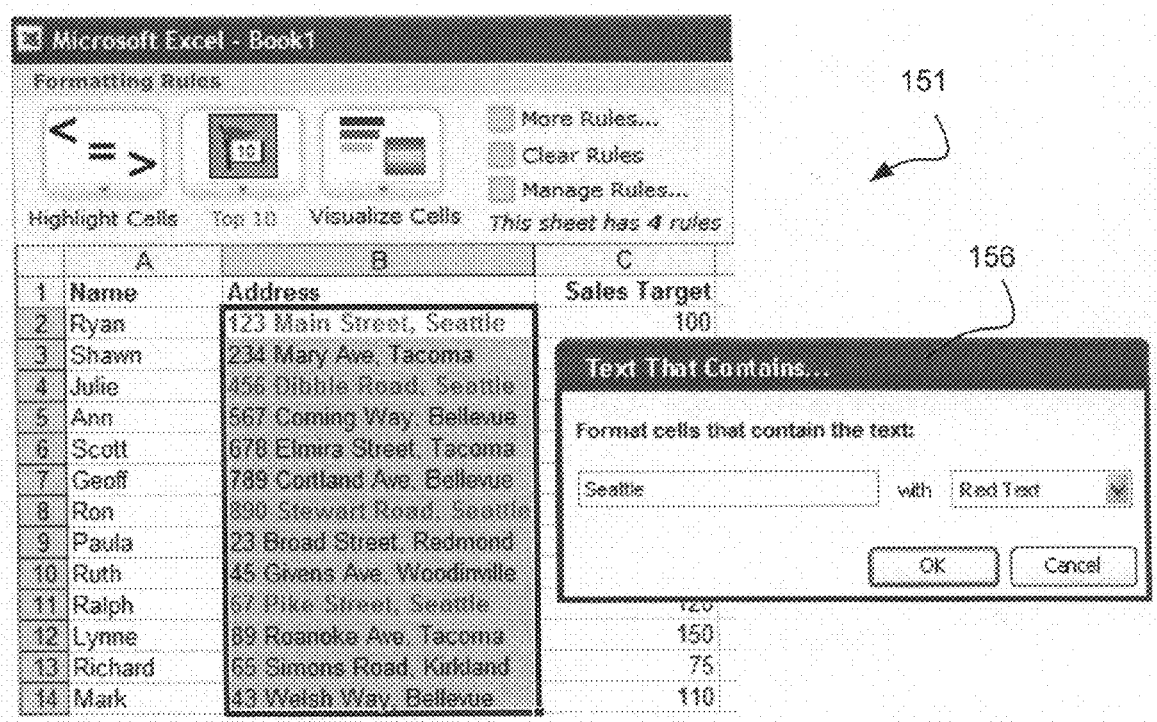
FIG. 11 is a screen shot of the spreadsheet shown in FIG. 10 when a user changes the text in the dialog box object.

Now, consider the spreadsheet 151 shown in FIG. 9. In the exemplary spreadsheet application such as Excel, there is always an "active" cell. FIG. 9 shows the first address 153 as the active cell. If the user has clicked and dragged the mouse to select a range of cells, the active cell remains the first cell clicked on before dragging. This cell content will appear in the dialog box 156. Now, if the user changes the dialog box content to "Seattle", all the displayed addresses that are located in Seattle will automatically immediately change to red text as shown in preview in FIG. 11. This conditioning will become permanent only when and if the user clicks OK in the dialog box 156.

Figure 10:
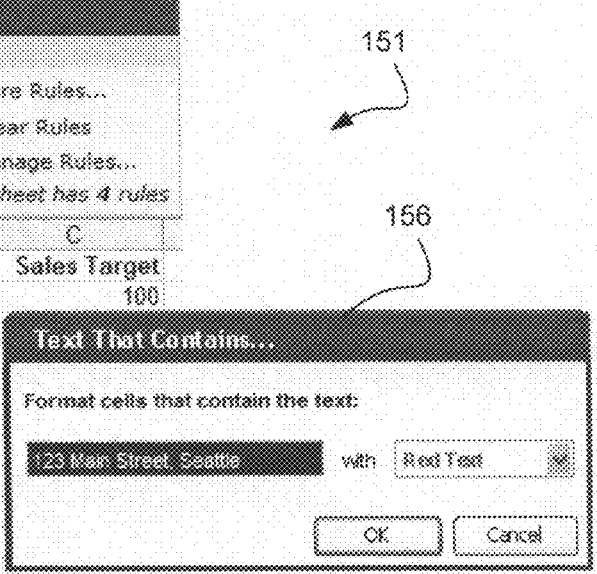
FIG. 10 is a screen shot of the spreadsheet shown in FIG. 9 when a user single clicks on the "Text that Contains" object shown in FIG. 1.
Figure 12:
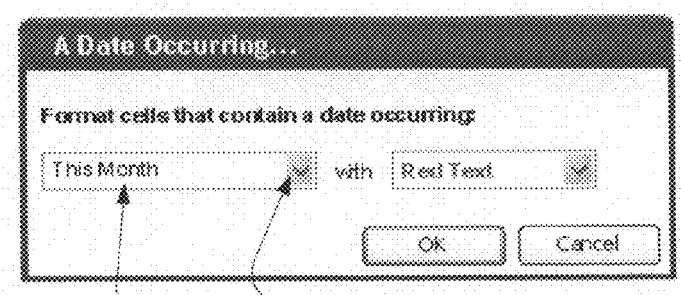
FIG. 12 is a separate view of a dialog box that appears if a user selects the Date Occurring object in FIG. 5.

When a user highlights and clicks on the A Date Occurring object 120, dialog box 160 shown in FIG. 12 appears. The default entry in the value box 162 is This Month, and a pull down arrow 164 indicates further options for the value. These options are: Yesterday, Today, Tomorrow, In the last 7 days, Last Week, This Week, Next Week, Last Month, and Next Month. If there are any cells in the range of cells in the spreadsheet being formatted that contain a date, those dates may be highlighted as in the examples discussed above with reference to FIGS. 9-11.

Figure 13:
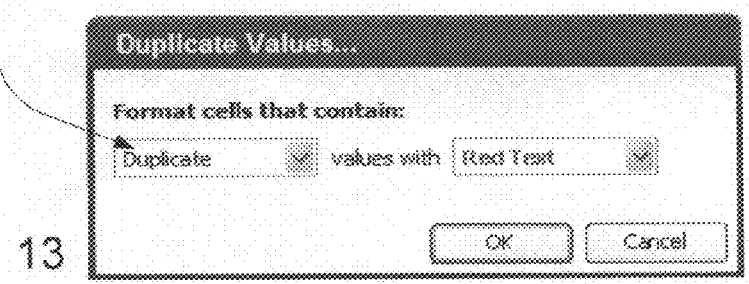
FIG. 13 is a separate view of a dialog box that appears if a user selects the Duplicate Values object in FIG. 5.

When a user highlights and clicks on the Duplicate Values object 122, a dialog box 166, as separately shown in FIG. 13, appears over the spreadsheet 100. The value box 168 has two options: Duplicate and Unique. Again, the dialog box 166 will automatically have focus and value selected. The default value in value box 168 is "Duplicate". Applying this conditional rule, looking for duplicates, results in no entry highlighted in red in spreadsheet 100

Figure 14:
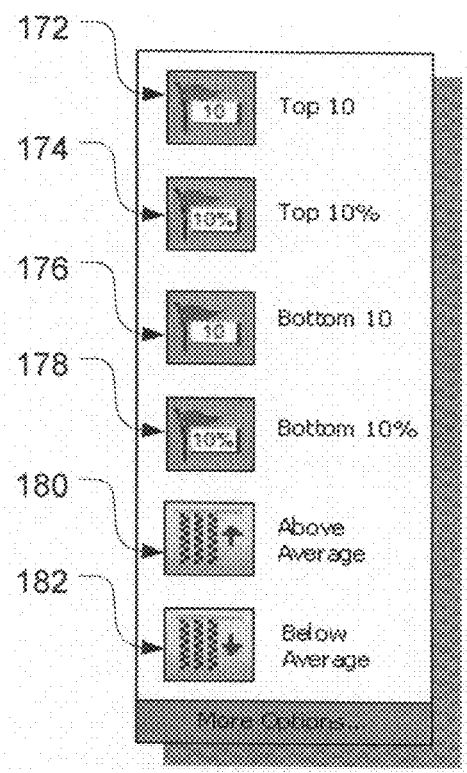
FIG. 14 illustrates a drop down menu that appears when the Top Ten Picker object is selected on the user interface shown in FIG. 1.
Figure 15:
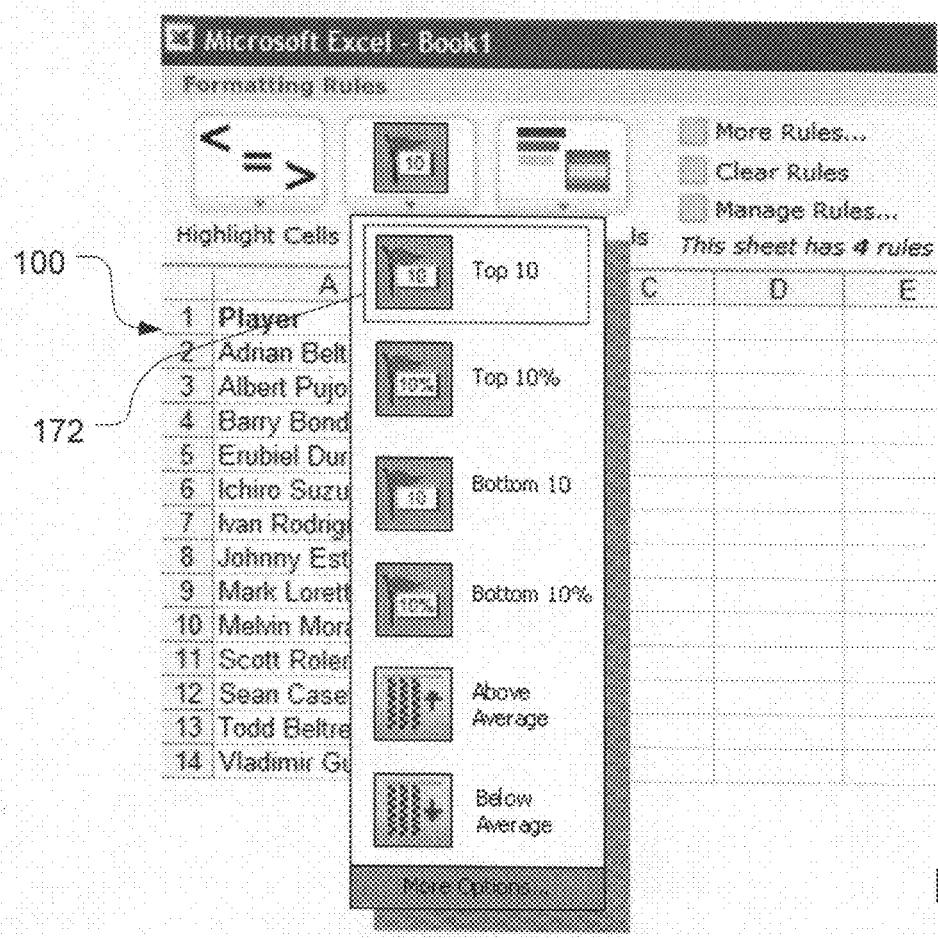
FIG. 15 is a screen shot of the spreadsheet shown in FIG. 1 when a user positions a cursor over the Top Ten object in the drop down menu shown in FIG. 12 according a particular embodiment of the present invention.

A similar functionality applies to the Top Ten Picker object 106. When a user clicks on, i.e. selects, this object 106, shown in FIG. 1, a drop down menu 170 appears. This drop down menu 170 is shown separately in FIG. 14. The menu 170 has a set of six option objects: Top 10 object 172, Top 10% object 174, Bottom 10 object 176, Bottom 10% object 178, Above Average object 180, and Below Average object 182. If a user moves the mouse cursor over any one of these objects 172 through 182, the underlying object will be outlined or highlighted. In FIG. 15, the spreadsheet 100 is shown after a user single clicks on the Top Ten Picker object 106, and positions the cursor over the Top 10 object 172.

Figure 16:
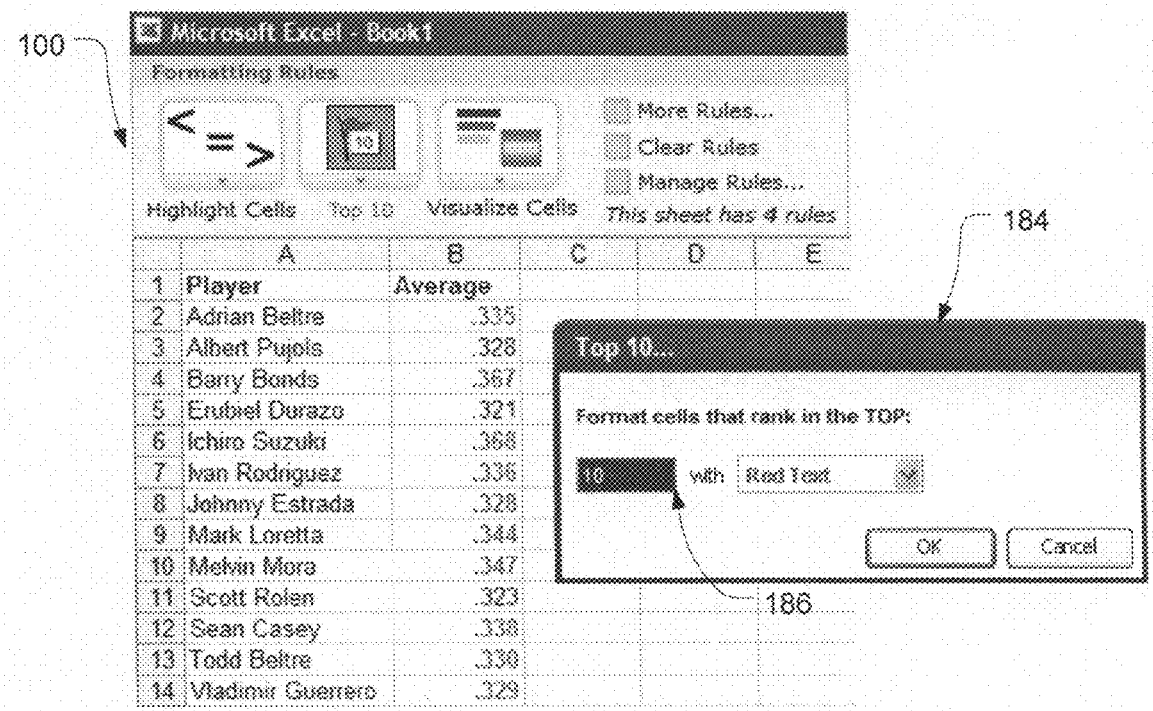
FIG. 16 is a screen shot of the spreadsheet shown in FIG. 1 when a user single clicks on the selected object highlighted in FIG. 15.
Figure 17:
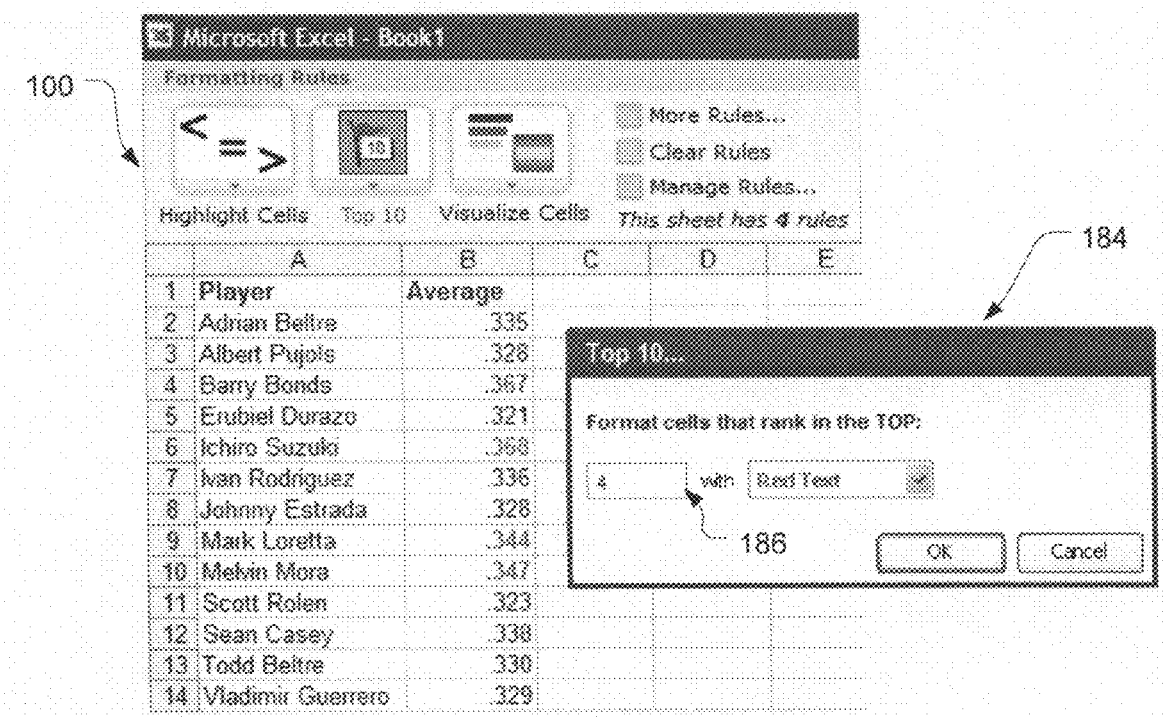
FIG. 17 is a screen shot of the spreadsheet shown in FIG. 16 in which a user has changed a default value in the dialog box.
Figure 18:
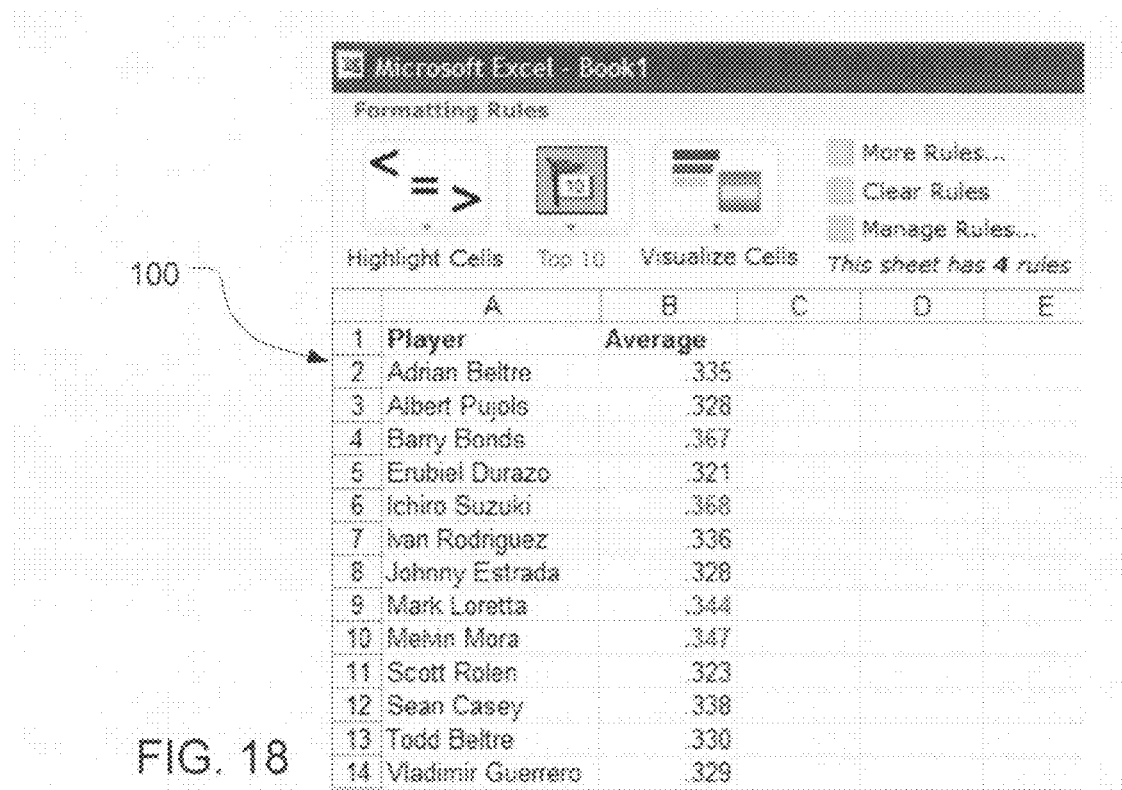
FIG. 18 is a screen shot of the spreadsheet shown in FIG. 17 after a user clicks "OK" in the dialog box to accept the preliminary changes as final changes in accordance with an embodiment of the present invention.

Now, if the user single clicks the left mouse button with the cursor over the Top 10 object 172, a Top 10 dialog box 184 appears, as in FIG. 16, in which control provides the default value 10 in the value box 186 and the 10 highest batting averages in spreadsheet 100 are highlighted in red and control indicates the value 10 is actively selected. The user may decide after viewing the preliminary result in spreadsheet 100 as shown in FIG. 16, that 10 is too high. The user may then choose a lower value such as "4" shown in FIG. 17. As soon as the value in value box 186 is changed to 4, the preliminary resulting 4 highest batting averages are highlighted as shown in FIG. 17. If the user clicks on the focused OK box, the conditional rule of top 4 will be actually applied to the spreadsheet 100, as shown in FIG. 18.

The Top 10% object 174, Bottom 10 object 176, and Bottom 10% object 178 conditional formatting sequences operate in substantially the same manner as just described for the Top 10 object 172 and shown in FIGS. 15-18. However, the operation of the Above Average object 180 and Below Average object 182 are somewhat different.

Figure 19:
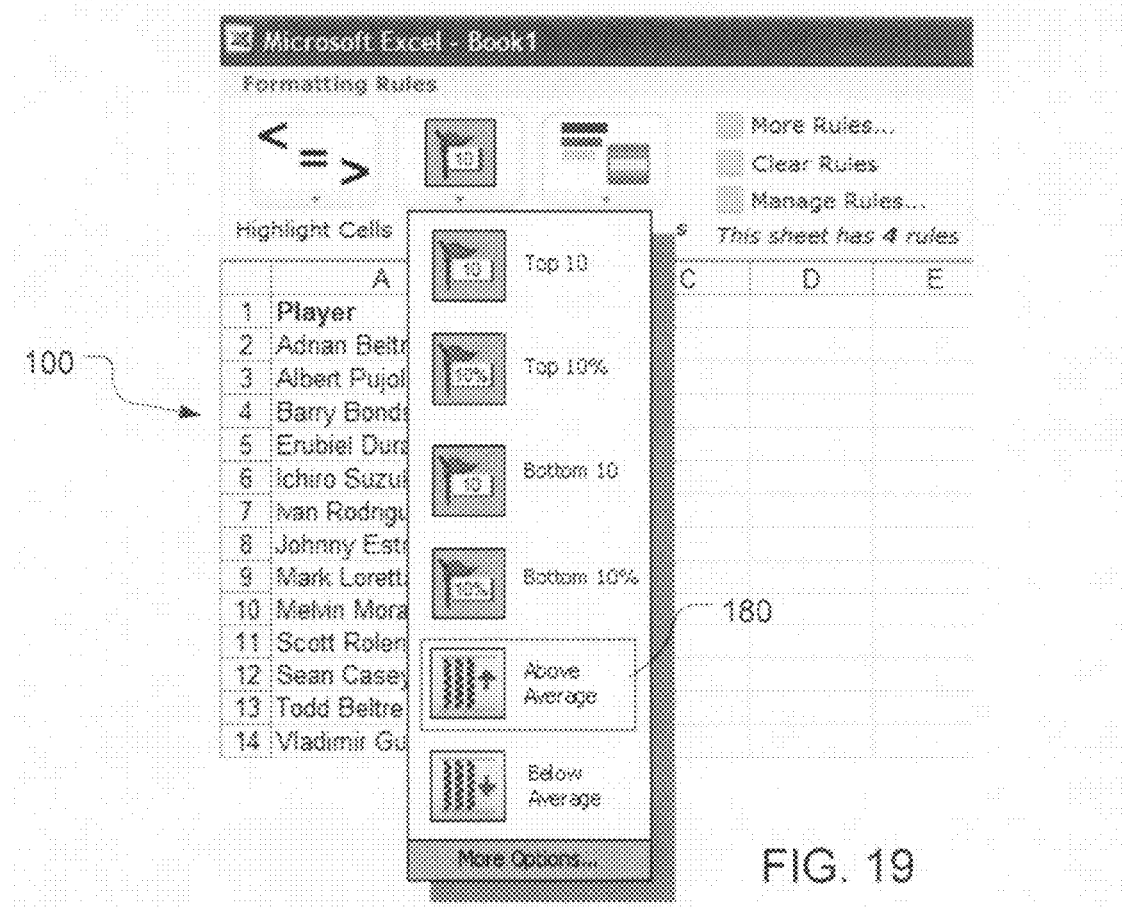
FIG. 19 is a screen shot of the spreadsheet shown in FIG. 1 after a user selects the Top Ten Picker object and places the cursor over the Above Average object in the drop down menu.

If a user moves the mouse cursor over either one of these objects 180 or 182, the underlying object will be outlined or highlighted as shown in FIG. 19 for Above Average object 180. In FIG. 19, the spreadsheet 100 is shown after a user single clicks on the Top Ten Picker object 106, and positions the cursor over the Above Average object 180. The following discussion referring to FIGS. 19-20 applies to the Below Average object 182 as well.

Figure 20:
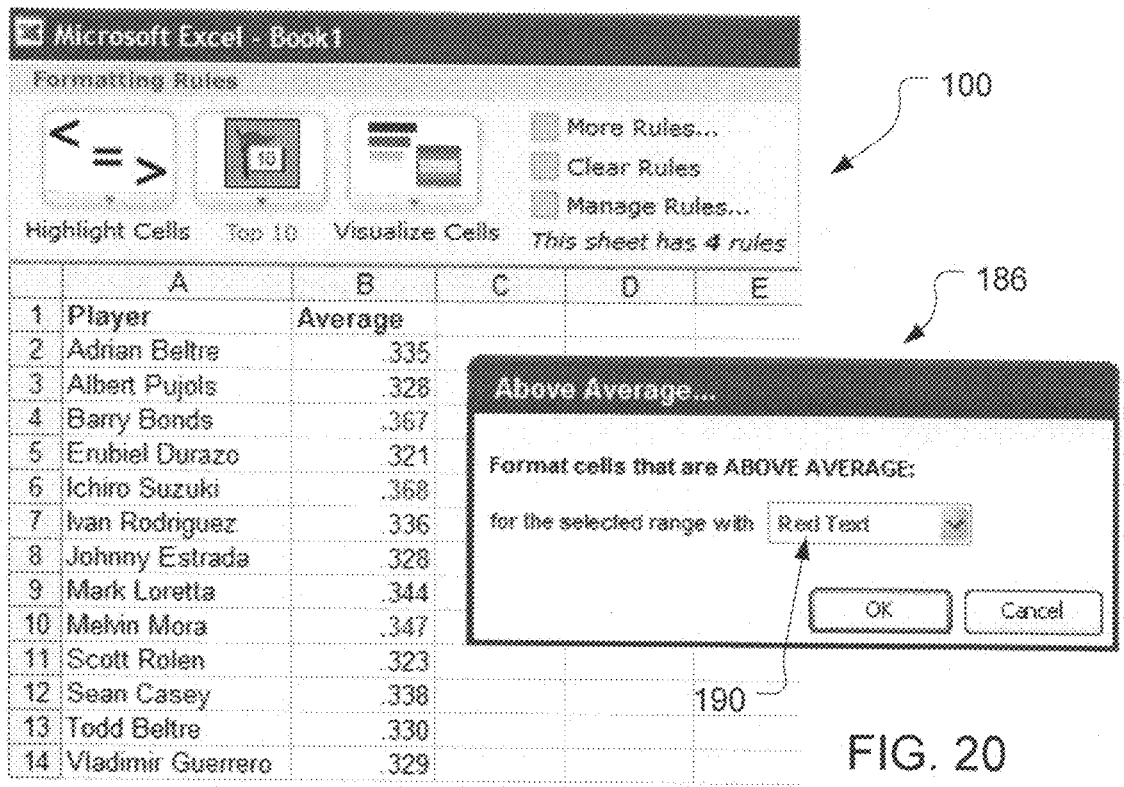
FIG. 20 is a screen shot of the spreadsheet shown in FIG. 19 after the user single clicks on the Above Average object.

Now, if the user single clicks his or her left mouse button with the cursor over the Above Average object 180, an Above Average dialog box 186 appears, as in FIG. 20, and the three batting averages in spreadsheet 100 above an average between the highest (0.368) and lowest (0.321) averages, which is above 0.344 (0.321+0.023), are highlighted in red. Note that in this case, there is no value box available. This is because the average is determined purely by the high and low values in the spreadsheet cells being evaluated, and is not alterable. The user may decide after viewing the preliminary result in spreadsheet 100 as shown in FIG. 20, that this average is not appropriate. The user may then choose to go to the highlight cells object 104 to make a selection as discussed with reference to FIGS. 5-8. If the Above Average condition is acceptable, the user selects "OK" and the rule is applied, and the dialog box 186 disappears.

Figure 21:
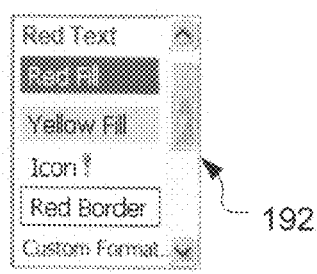
FIG. 21 is a separate view of the expanded formatting drop down menu in each of the dialog boxes shown in FIGS. 4, 6, 7, 11-13, 16, 17 and 20.

The highlighting format box 190 available to the user in any of the dialog boxes shown in FIGS. 1-18 to select the highlighting format is by default set at red text. However, this may be altered as shown by the drop down menu 192 in FIG. 21. There are four additional preset highlighting formats: red fill, yellow fill, an Icon, and a red border. In addition, a custom format option is also provided so that a user can change the highlighting to be applied. When the values in the highlighting box 190 are changed, the result is immediately shown in the preliminary view. The selected highlighting is only permanently applied when the OK box is selected. If the user clicks Cancel, all formatting associated with the condition is removed, and the condition is not saved.

Figure 22:
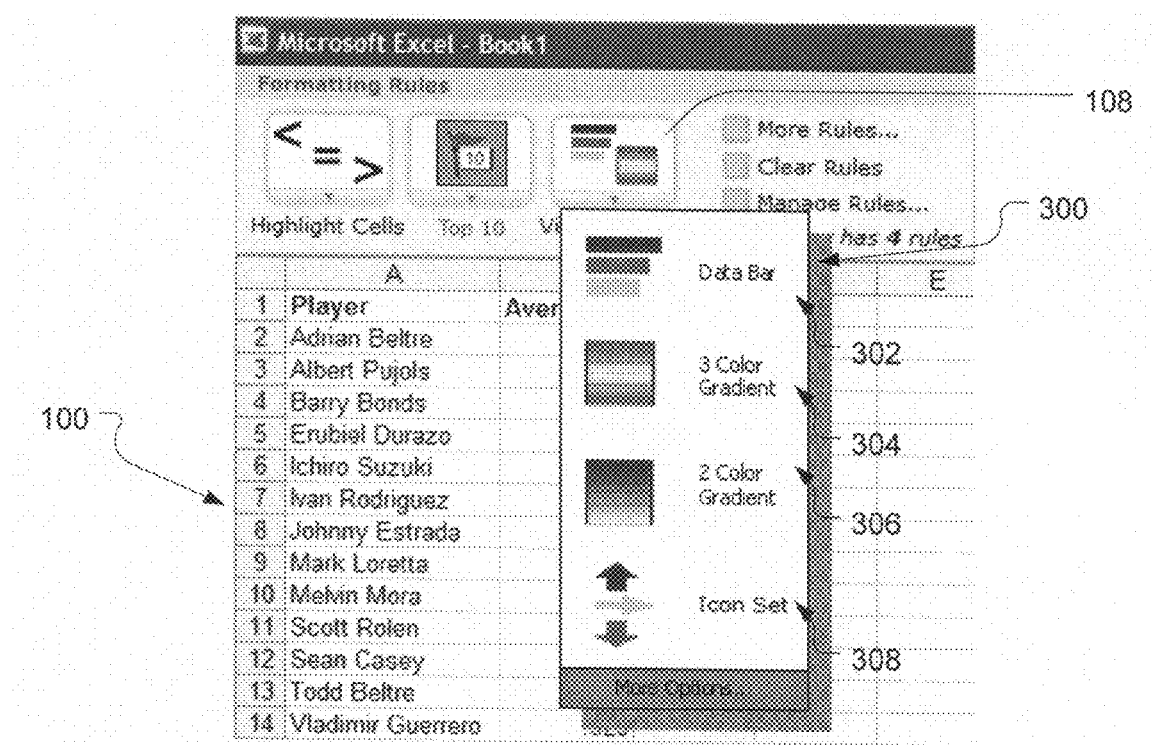
FIG. 22 is a screen shot of the spreadsheet shown in FIG. 1 when a user selects the Visualize Cells Picker object on the user interface, showing the drop down menu according a particular embodiment of the present invention.
Figure 23:
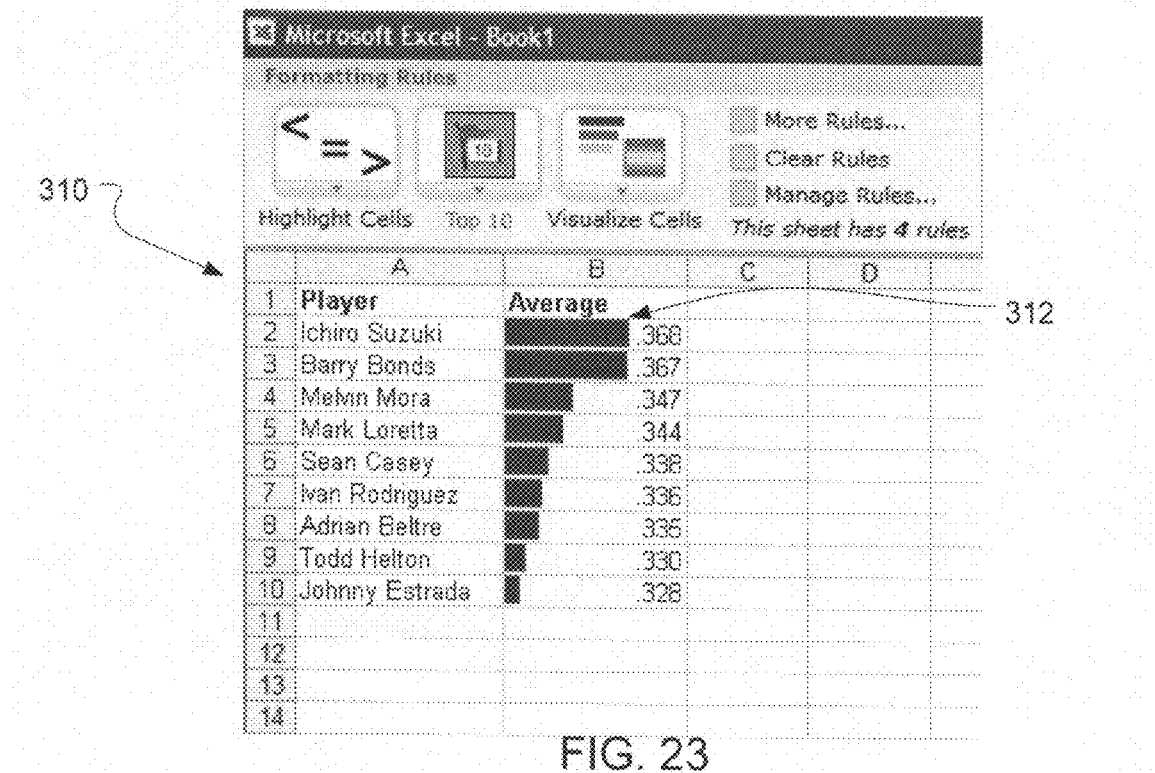
FIG. 23 is a screen shot of another exemplary spreadsheet when a user single clicks on the Data Bar object in the drop down menu shown in FIG. 22.

The Visualize Cells Picker object 108 operates in slightly a different manner than objects 104, and 106 described above. The Visualize Cells Picker object 108 formats every cell in the selected cell range differently, according to its relative value. When the Visualize Cells Picker object 108 is selected by a user a drop down menu 300 appears over the spreadsheet 100, as shown in FIG. 22. This drop down menu displays a Data Bar object 302, a 3 Color Gradient object 304, a 2 Color Gradient object 306, an Icon Set object 308, and, as in the other drop downs, a link to more options. However, unlike the other picker objects, there is no dialog box displayed as a formatting rule is immediately added to the selected cell range. The result of selecting the Data bar object 302 is shown for a different spreadsheet 310 in FIG. 23. A bar 312 is added to each cell of the spreadsheet 310 that has a length representative of the relative value of the parameter in the range of the cells. Thus the average for Ichiro Suzuki is indicated as longest and Johnny Estrada's bar is shortest.

Figures 24, 25:
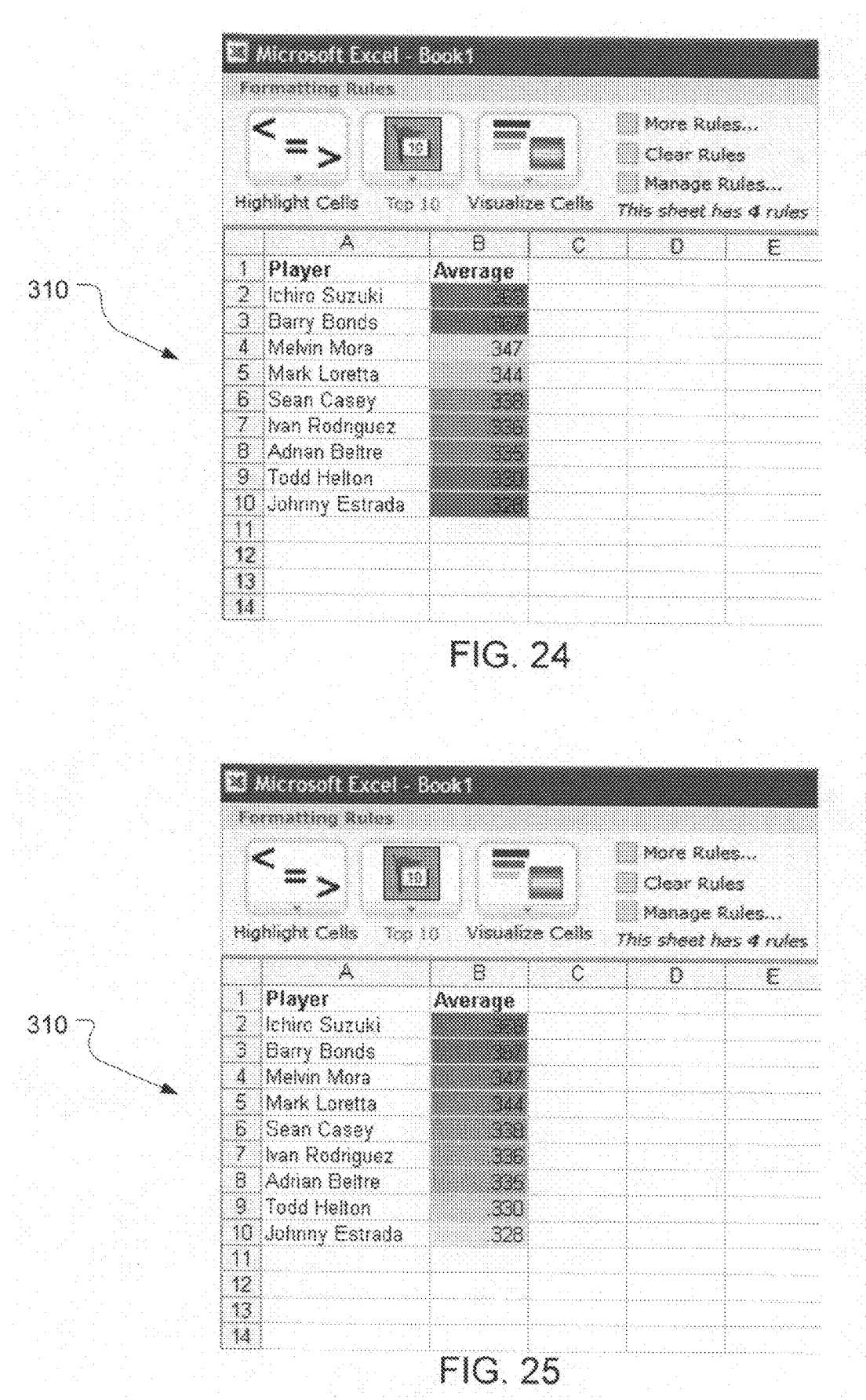

If a user selects the 3 Color Gradient object 304, the spreadsheet 310 will look like that shown in FIG. 24. Here, different colors are used to fill the cells to indicate the relative strength of the averages. The highest value in the range is formatted with the color green, while the lowest value in the range is formatted with the color red. The color yellow is assigned to the value halfway between the highest and lowest value. An algorithm then calculates the color shade for all other cells in the range by matching its value to a point on the gradient color scale created by the red, yellow and green points.

If a user selects the 2 color Gradient object 306, the spreadsheet 310 will look like that shown in FIG. 25. This works the same way as the 3 Color Gradient, but we only have two colors. In the example, the two colors are green and yellow. The highest value in the range is formatted with the color green, and the lowest value in the range is formatted with the color yellow. An algorithm calculates the specific color shade between green and yellow that should be assigned to other cell values in the range. The colors used are default colors, that may be changed in the custom formatting options.

Figure 26:
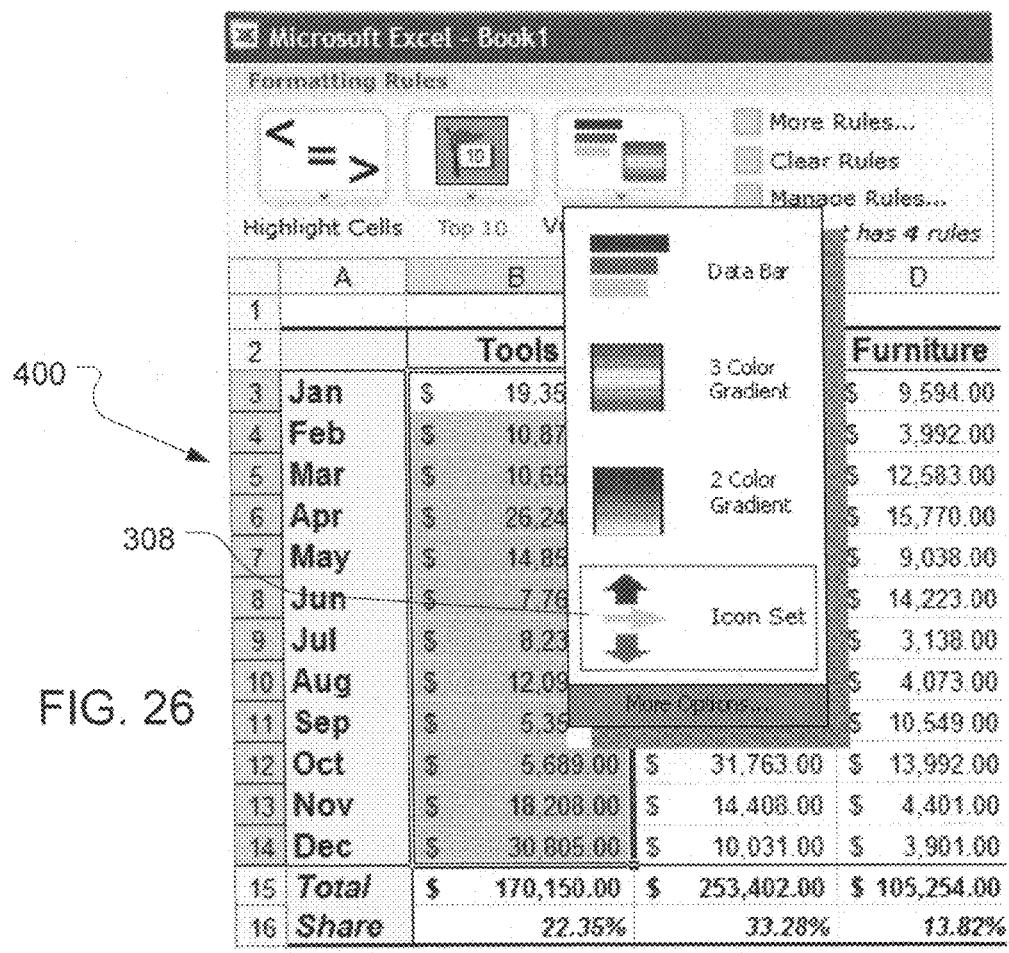
FIG. 26 is a screen shot of another spreadsheet when a user selects the Visualize Cells Picker object on the user interface, showing the cursor highlighting the Icon Set object in the drop down menu.

In the Visualize Cells picker, if a user selects the Icon Sets object 308, as shown in the view of an exemplary spreadsheet 400 shown in FIG. 26, a 3 icon set 326 consisting of red, yellow and green arrows automatically appears in the spreadsheet 400 as shown in FIG. 27. Application of the arrows is predetermined, with upper third in the range getting the green up arrow, the lower third getting a down red arrow, and the middle third getting a horizontal yellow arrow.

Figure 28:
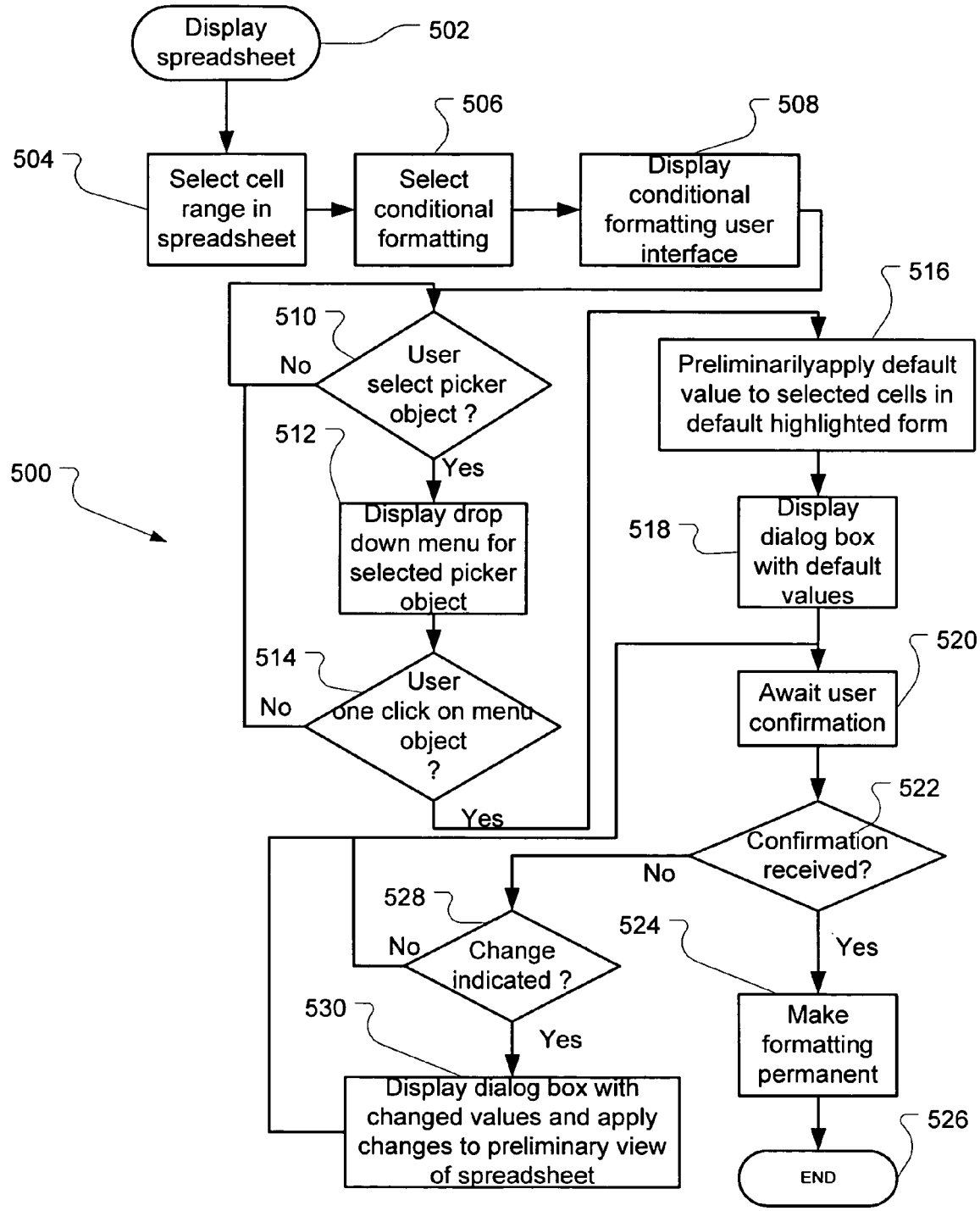
FIG. 28 is an operational flow diagram of the operations in the conditional formatting routine in the embodiments of the present invention shown in FIGS. 1 through 27.

Turning now to the operational flow diagram 500 shown in FIG. 28, the sequence of operations for the conditional formatting of a spreadsheet, or other document, in accordance with the present invention will be described. First, a spreadsheet or other document is opened and displayed in operation 502. A user then selects a cell range within the spreadsheet in operation 504, typically by holding down the left mouse button and dragging the cursor over the range of cells to be modified. Note that it is possible to select a non-contiguous range of cells by holding down the Ctrl key. The user next selects the operation to be applied from the main toolbar on the spreadsheet display (not shown). In the present invention, to access the formatting rules toolbar, the user need only click on the analysis tab on the main toolbar. For the particular embodiment of the present invention described above, this is depicted as control operation 506. When a user selects the analysis tab from the main toolbar of the application, the formatting rules toolbar 102 appears over the spreadsheet display as shown in FIG. 1. This is depicted as control operation 508 in FIG. 28. Control then transfers to query operation 510 where control awaits action by the user to select one of the picker objects 104, 106, or 108 as, for example, is shown in FIG. 4. If the answer in query operation is no, the user has not yet selected a picker object, the control returns to the query operation 510, i.e., operations are suspended until a picker object is selected. When a picker object is selected, the answer in operation is yes, and control transfers to operation 512.

In operation 512, a drop down menu is displayed below the particular picker that the user has selected. This drop down menu is sensitive to the user's cursor position. The user places the cursor over one of the objects in the drop down menu. During this time control transfers to query operation 514 where control awaits the user to apply a single click on the cursor when it is positioned over one of the objects in the pull down menu. If a user clicks on one of the objects, that object's default values in a default format are automatically applied to the selected cell range identified in operation 504. As with all standard Windows application drop down menus, clicking anywhere outside the drop down menu will cause it to close. If the user has clicked on one of the objects, control transfers to operation 516.

In operation 516, the condition called for by the selected object and the default values for that object are applied to the displayed spreadsheet view. No changes are made to the stored spreadsheet. Only the displayed spreadsheet cell values are modified in accordance with the default values and format. Control then transfers to operation 518.

In operation 518, a dialog box is displayed that has the default values and format shown in the value box and format box. This dialog box is focused on the default value and an "OK" acceptance box. Control then transfers to operation 520 to await confirmation by the user. If the user clicks on OK, control transfers to operation 524.

In operation 524, the changes preliminarily made to the spreadsheet display are made permanent in the spreadsheet. Control then passes to end operation 526 where the process terminates.

However, if the user does not like the default selection value provided in operation 516, the user does not confirm. Instead, the user can enter a different value in the focused value box or select a different formatting parameter in the dialog box. In this case control automatically transfers from operation 518 to query operation 528 in which the answer is yes. Control then transfers to operation 530 where the changed value is displayed in the dialog box and the change is immediately applied to the preliminary spreadsheet display. Control then returns to await user confirmation operation 520 where the control awaits the user confirming the changed formatting by clicking OK in the dialog box. Again, if the changed values are acceptable to the user, and the user clicks OK, then control transfers to operation 524 where the changed conditions are applied. Control then passes to end operation 526.

Although the invention has been described in language specific to structural features, methodological acts, and computer readable media containing such acts, it is to be understood that the invention defined in the appended claims is not necessarily limited to the specific structure, acts or media described. As an example, the above described conditional formatting can be applied to a word processing document such as Microsoft® Word or Microsoft® PowerPoint, and any other number or word processing application in a similar manner. Therefore, the specific structure, acts or media are disclosed herein only as preferred forms of implementing the claimed invention. They should not be interpreted as limiting the scope of the present invention. Further, many variations and changes and alternatives will readily suggest themselves to one ordinarily skilled in the art. Accordingly all such variations, changes and alternatives are also within the intended broad scope and meaning of the invention as defined by the appended claims.

What is claimed is:

1. A method of conditionally formatting a display of data comprising:
   selecting a portion of the display of data from a spreadsheet for applying the conditional formatting, wherein the selected portion of the display of data has not been predefined for receiving the conditional formatting;
   selecting a conditional template object from a set of displayed conditional template objects;
   displaying a set of predetermined conditional options of the selected conditional template object;
   selecting a predetermined conditional option from the set of predetermined conditional options, wherein the predetermined conditional option comprises a predetermined format that provides data bars corresponding to relative magnitudes of data within the selected portion of the display of data;
   as an automatic result of selecting the predetermined conditional option:
   automatically applying temporarily the predetermined format to a first portion of the selected portion of the display of data from the spreadsheet that meets a default parameter associated with the predetermined conditional option and leaving a second portion of the selected portion that does not meet the default parameter in an original format; and
   automatically displaying a temporary preview within the spreadsheet on the display of the predetermined format applied to the first portion that meets the default parameter and displaying the second portion that does not meet the default parameter in the original format, wherein the data bars are displayed in association with the first portion that meets the default parameter.

2. The method as defined in claim 1 wherein the method is performed by a computer operating system.

3. The method as defined in claim 1 wherein the display of data is spreadsheet data.

4. A tangible computer program product embodied in a storage medium readable by a computer system and tangibly embodying a program of instructions executable by the computer system to perform the method of claim 1.

5. A tangible computer program product embodied in a storage medium readable by a computer and encoding instructions for executing a computer process for displaying spreadsheet data on a display using conditional formatting, the process comprising:
   selecting a portion of spreadsheet data from a spreadsheet to be conditionally formatted on the display, wherein one or more cells containing the selected portion of spreadsheet data have not been predefined for receiving the conditional formatting; and
   selecting a predetermined condition, wherein the predetermined condition comprises a predetermined format that provides data bars corresponding to relative magnitudes of cells in the selected portion of spreadsheet data;
   as a result of selecting the predetermined condition:
   automatically applying temporarily the predetermined format within the spreadsheet to an active cell of the selected portion of spreadsheet data and to additional cells of the selected portion of spreadsheet data that match a content of the active cell, and leaving a remainder of cells of the selected portion of spreadsheet data that do not match the active cell in an original format of the selected portion of spreadsheet data; and
   automatically displaying a temporary preview on the display of the predetermined format applied to the active cell and to the additional cells that match the content of the active cell, wherein the data bars are displayed in association with the active cell and with the additional cells that match the content of the active cell, and displaying the remainder of cells of the selected portion of spreadsheet data that do not match the content of the active cell in the original format of the selected portion of spreadsheet data.

6. The tangible computer program product as defined in claim 5 wherein the predetermined condition is selected from a predetermined set of conditions.

7. The tangible computer program product as defined in claim 5 wherein the conditional formatting is selected from a predetermined set of display formats.

8. A graphical user interface operable by a processor in a memory of a computer system, the graphical user interface having a display module for displaying data on a display device, said graphical user interface comprising:
   a selection module operable by the processor in the memory of the computer system for receiving a selection of data from a spreadsheet displayed on the display device to be conditionally formatted on the display device, wherein the selection of data has not been predefined for receiving the conditional formatting;
   a condition module operable by the processor in the memory of the computer system for providing a set of predetermined conditions that are displayed on the display device;
   a format module operable by the processor in the memory of the computer system for displaying the set of predetermined formats on the display device, wherein one of the set of predetermined formats comprises data bars corresponding to relative magnitudes of data within the selection of data;
   a preview module operable by the processor in the memory of the computer system for automatically applying temporarily the one of the set of predetermined formats to a first portion of data of the selection of data from the spreadsheet that matches a content of an active cell or that meets a default parameter, leaving a second portion of data of the selection of data that does not match the content of the active cell or that does not meet the default parameter in an original format of the selection of data;
   wherein as an automatic result of selecting a one of the set of predetermined conditions, the preview module automatically displays a temporary preview within the spreadsheet on the display device of the selection of data using the one of the set of predetermined formats applied to the first portion of data that matches the content of the active cell or meets the default parameter, wherein the data bars are displayed in association with the first portion of data, and displaying the second portion of data that does not meet the content of the active cell or that does not meet the default parameter in the original format of the selection of data.

9. The graphical user interface as defined in claim 8 wherein the predetermined condition is selected from a predetermined set of conditions.

10. The graphical user interface as defined in claim 8 wherein if one of the set of predetermined conditions is met by the data, then the predetermined format is applied to the data and displayed on the display.

11. The graphical user interface as defined in claim 8 further comprising a condition dialog module for permitting a modification of the predetermined condition to be made after preview and prior to a conditional formatting acceptance.

12. The graphical user interface as defined in claim 8 further comprising a formatting dialog module for permitting a modification of the predetermined format to be made after preview and prior to a conditional formatting acceptance.

* * * * *

UNITED STATES PATENT AND TRADEMARK OFFICE
CERTIFICATE OF CORRECTION

PATENT NO.       : 7,933,862 B2                                                    Page 1 of 1
APPLICATION NO.  : 10/951468
DATED            : April 26, 2011
INVENTOR(S)      : Benjamin C. Chamberlain It is certified that error appears in the above-identified patent and that said Letters Patent is hereby corrected as shown below:

On the title page, item (75), under "Inventors" column 1, line 6, delete "David E. Gainer" and insert -- David F. Gainer --, therefor.

Signed and Sealed this
Twenty-sixth Day of July, 2011

David J. Kappos
*Director of the United States Patent and Trademark Office*